No. 858,575. PATENTED JULY 2, 1907.
C. A. CLAFLIN.
HOSE COUPLING.
APPLICATION FILED MAY 7, 1906.
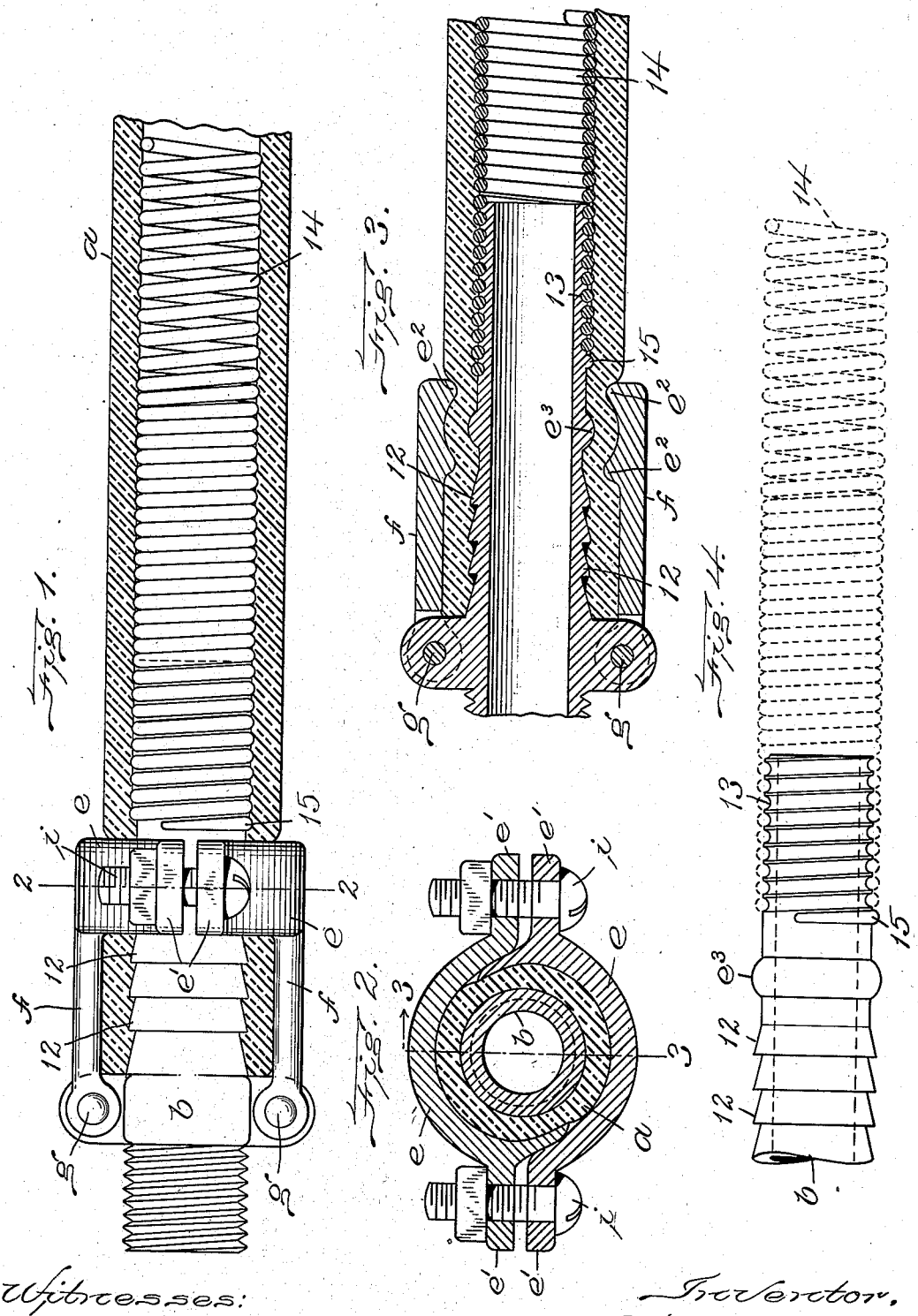

UNITED STATES PATENT OFFICE.

CHARLES A. CLAFLIN, OF MEDFORD, MASSACHUSETTS.

HOSE-COUPLING.

No. 858,575.  Specification of Letters Patent.  Patented July 2, 1907.

Application filed May 7, 1906. Serial No. 315,500.

To all whom it may concern:

Be it known that I, CHARLES A. CLAFLIN, of Medford, in the county of Middlesex and State of Massachusetts, have invented certain new and useful Improvements in Hose-Couplings, of which the following is a specification.

This invention relates to couplings for flexible hose, and is embodied in a coupling member having a nipple adapted to be inserted in either end of a piece of hose, and to be detachably engaged with a complemental coupling member or a valve or other fitting.

The invention has for its chief object to provide the nipple with a flexible extension adapted to enter the hose with the nipple, and to project into the hose beyond the entering end of the nipple to prevent abrupt bending and collapsing of the portion of the hose immediately adjacent to the nipple.

The invention also has for its object to provide certain incidental improvements.

The invention consists in the several improvements which I will now proceed to describe and claim.

Of the accompanying drawings forming a part of this specification,—Figure 1 represents a side elevation of a hose coupling nipple embodying my invention, and a piece of hose engaged therewith. Fig. 2 represents a section on line 2—2 of Fig. 1. Fig. 3 represents a section on line 3—3 of Fig. 2. Fig. 4 represents a side elevation of a portion of the nipple, the flexible extension being shown in dotted lines.

The same letters of reference indicate the same parts in all the figures.

In the drawings, $a$ represents a piece of flexible hose, and $b$ represents a tubular nipple, a portion of which is adapted to be inserted in one end of the hose $a$. The said portion is preferably provided with external corrugations 12 on that portion which enters the hose, and with a rigid extension in which is formed a helical groove 13, the said grooved extension being on the portion of the nipple which enters the hose.

14 represents a flexible resilient extension of the nipple, composed of a helically coiled wire, several of the convolutions of which are engaged with the helical groove 13, the operation of engaging the said convolutions with the groove being effected by screwing the said convolutions on to the portion of the nipple in which said groove is formed. The nipple is preferably provided at the inner end of the helical groove with a stop or abutment 15, against which the inner end of the coiled wire abuts when the coil has been screwed to the desired point on the nipple, the said abutment preventing the coiled wire from being screwed inwardly too far upon the nipple. The convolutions of the coil 14 which are engaged with the nipple, are preferably secured by solder, so that the coil is rigidly attached at its inner end portion to the nipple. The coil or flexible extension 14, being rigidly connected with and projecting outwardly from the nipple enables the hose to be secured to or removed from the said flexible extension by a swinging action. When so assembled the extension projects into the hose, and bears upon a considerable portion of the interior of the hose adjacent to the nipple, without forming a permanent lining for any part of the hose. The said flexible extension forms a resilient internal support for the hose, maintaining the full size of the passage, and preventing the abrupt bending and the collapsing and consequent breaking of that portion of the hose which is adjacent to the nipple, thus prolonging the life and usefulness of the hose.

The nipple is provided at one end with suitable means for engaging a complemental coupling member, the said means, as here shown, comprising an external screw thread 16 on one of the end portions of the nipple, the said thread being adapted to engage an internal thread in a valve or fitting.

Means are provided for clamping the end portion of the hose upon the nipple, the preferred means being two semi-circular clamps $e$ $e$, adapted to substantially surround the hose, and formed on arms $f f$, which are hinged at $g$ $g$ to ears formed on the nipple. The clamps are provided with ears $e'$, which are connected by bolts $i$. The portion of the coupling which surrounds the hose is preferably provided with inwardly-projecting ribs $e^2 e^2$, the corresponding portion of the nipple being provided with an outwardly-projecting circumferential rib $e^3$, engaging the inner surface of the hose at a point between the points where the ribs $e^2 e^2$ engage the outer surface of the hose, as shown in Fig. 3.

Referring to Fig. 3 it will be seen that the construction is such that, in a direction or line of section parallel with the longitudinal center of the coupling, the rib $e^3$ of the nipple is curved or rounded, and the space between the ribs $e^2 e^2$ of the clamps is internally rounded or curved concentrically with the curve of the rib $e^3$. Therefore, the material of the hose is bent without being unduly bitten so as to be cut or injured or otherwise weakened by the opposing ribs of the device.

It will be seen that the flexible extension 14 is practically tubular, and forms a flexible tubular lining for a portion of the internal surface of the hose, the said lining being rigidly attached at one end to the nipple, and reinforcing the portion of the hose which is adjacent to the nipple, so that the said portion cannot be bent abruptly, but is required to bend at a gentle curvature.

I do not limit myself to the means here shown and described for clamping the hose to the nipple, and for detachably connecting the nipple to a complemental coupling member, as the construction may be variously modified as to these features without departing from the spirit of the invention.

The pitch of the convolutions of the coil 14 is preferably decreased gradually from the outer to the inner portion of the coil, the convolutions being separated from each other at the outer portion, and more closely wound at the inner portion. This construction increases the resilience of the outer portion of the coil, and reduces the liability of the hose to bend and crack over or upon the outer end of the coil.

I claim:

1. A hose coupling comprising a rigid tubular nipple adapted to enter a piece of hose, and provided with a helically coiled wire having a plurality of its coils each rigidly attached to the nipple and forming a flexible extension of the nipple adapted to be removably connected with the hose, said nipple having means for engaging a complemental coupling member.

2. A hose coupling comprising a tubular nipple having an external helical groove in one of its end portions, a stop at the inner end of said groove, and a helically coiled wire having a plurality of its coils each rigidly engaged with said groove and abutting at its inner end against said stop, the said coiled wire forming a flexible extension projecting from one end of the nipple and adapted to removably engage the interior of a piece of hose, the said nipple having means at its opposite end for engaging a complemental coupling member.

3. A hose coupling comprising a tubular nipple provided at one end with a flexible extension composed of a helically coiled wire rigidly attached to the nipple and projecting therefrom into the hose, said nipple having a circumferential rib adjacent to the inner end of the coiled wire, and clamps hinged to the nipple and provided with internal ribs located at opposite sides of the said external rib, the nipple being provided at one end with means for engaging a complemental coupling member.

4. A hose coupling comprising a rigid tubular nipple having a flexible extension composed of a helically coiled wire having a plurality of its coils each rigidly attached to the nipple and projecting therefrom into the hose, the convolutions of the coil decreasing in pitch from the outer portion of the coil inwardly to increase the resilience of the said outer portion, the said coil being independent of the hose whereby the hose may be connected to the nipple or removed therefrom while the coil remains as an extension of the nipple.

5. A hose coupling comprising a tubular nipple having a circumferential enlargement forming an outwardly-projecting convex rib between its end portions, and clamps hinged to the nipple, and provided with internal ribs located at opposite sides of the said external rib, and separated by a concave recess surrounding and corresponding to the external rib, the rib of the nipple and the space between the ribs of the clamps presenting opposing surfaces which are substantially concentrically curved to bend the material of the hose without unduly biting it, the nipple being provided at one end with means for engaging a complemental coupling member.

In testimony whereof I have affixed my signature, in presence of two witnesses.

CHARLES A. CLAFLIN.

Witnesses:
E. H. CRANDELL,
THOS. J. BERRY.